Sept. 7, 1954     E. HEDENSKOOG     2,688,486
SEMIAUTOMATIC BOWLING PIN SETTER
Filed March 2, 1949     9 Sheets-Sheet 4

Inventor.
Ernest Hedenskoog.
Attorney.

Sept. 7, 1954          E. HEDENSKOOG          2,688,486
SEMIAUTOMATIC BOWLING PIN SETTER
Filed March 2, 1949          9 Sheets-Sheet 8

Inventor.
Ernest Hedenskoog.
By [signature]
Attorney.

Patented Sept. 7, 1954

2,688,486

UNITED STATES PATENT OFFICE 2,688,486

SEMIAUTOMATIC BOWLING PIN SETTER

Ernest Hedenskoog, Muskegon, Mich., assignor to The Brunswick-Balke-Collender Company, Chicago, Ill., a corporation of Delaware Application March 2, 1949, Serial No. 79,928

8 Claims. (Cl. 273—42)

More particularly the invention relates to a pinsetter that is power actuated and semi-automatic in operation.

It is the general object of the invention to provide a new and improved semi-automatic pinsetter which is motor driven and, when started by an operator, continues through a pin setting cycle of operation and stops with the pin deck in its raised or out of the way position without further attention by the operator.

Other objects of the invention are to provide a semi-automatic bowling pinsetter which may be readily installed above the pin deck of a bowling alley; which is smooth and quiet in operation; which requires a relatively small amount of power for its actuation; which embodies a gear box having a crank on its output shaft connected to actuate the pinsetter deck and arranged to rotate the crank through a single revolution when once started by an operator; which has a pinsetter deck structure mounted for vertical movement from an upper pin receiving position to a lower pin setting position and return and is counter-balanced to avoid peak loads on the driving motor; which embodies safety release mechanism which functions to interrupt the drive to the deck structure in the event the deck encounters an obstruction; which embodies a means for locking up the safety release mechanism as the deck reaches its lower or pin setting position to prevent the release mechanism from operating during the pinsetting operation; which has a deck structure adapted to receive and set bowling pins on the alley bed as the deck structure reaches its pinsetting position; and which embodies means operable to pick up the pins previously set on the bowling alley when so desired, by an operator.

Further objects and advantages will become readily apparent in the following detailed description taken in connection with the accompanying drawings, in which:

Fig. 12 is a fragmentary perspective view, partly diagrammatic, of the deck structure;

Fig. 15-a is a fragmentary plan view of a part of the deck structure shown in Fig. 15.

While there is illustrated in the drawings and shall herein be described in detail a preferred embodiment of the invention, it is to be understood that the invention is not limited to the particular form and arrangement shown, it being contemplated that various changes may be made by those skilled in the art without departing from the spirit and scope of the appended claims.

Figure 1:
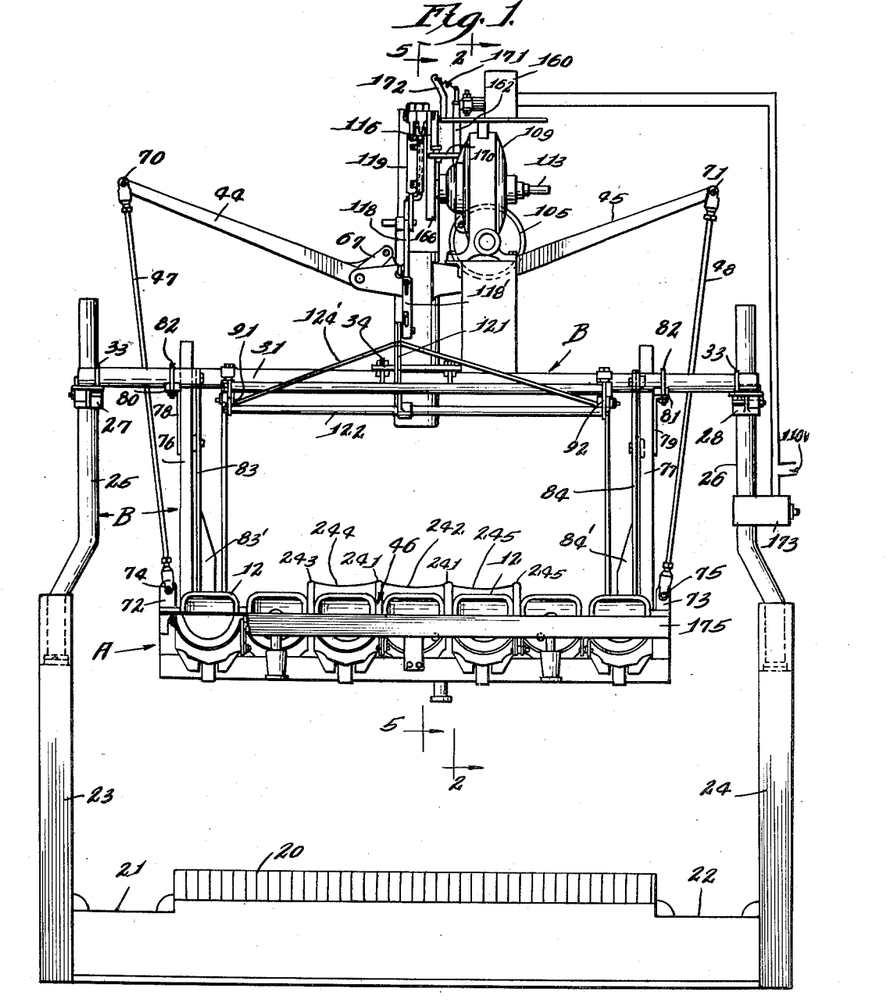
Fig. 1 is a rear elevational view of a preferred form of the invention installed on the kickbacks of a bowling alley and above the pin spots thereof.

In the drawings, a preferred form of the invention is shown in position over the rear end of a bowling alley bed 20 and comprises generally a deck structure A provided with pin receiving and setting means thereon which is mounted for movement from a raised or pin receiving position as shown in Fig. 1 to a lowered or pin setting position adjacent the bed 20. The deck structure as well as the other parts of the machine are supported by a supporting frame indicated generally at B. The deck structure is an improvement on the construction of U. S. Letters Patent No. 2,284,208 to Ernest Hedenskoog, dated May 26, 1942, and includes a deck frame 46 generally triangular in shape (Fig. 3) and provided with ten pin receiving pockets numbered 1 to 10 in the manner generally used for bowling alley pin positions and arranged in accordance with the pin spots on the alley bed. Chutes 11 to guide the pins into the pockets and to aid in supporting the pins in reclining positions with their head ends to the rear (right as in Fig. 2) are provided at each pocket by pressing down portions of the sheet metal top of the frame 46. Opposite the chute the edge of each pocket bears a shield 12 which prevents the pins from overshooting the pocket when inserted by an operator and tends to guide the pins into the pocket as they are tossed onto the frame by an operator. When the deck structure is in its upper position the pins normally assume the reclining position shown for pin P in Fig. 2, the bottom of the pin then resting upon an inclined ledge 13 and the upper portion of the pin resting against the lower edge of the chute 11. The deck frame carries a plurality of rubber bumpers or pads 14 on the lower portion thereof which are arranged to engage the alley bed when the setter frame reaches its lowermost position. The mechanism for setting the pins and which includes for each pin pocket a front jaw or shoe 15 and a rear jaw or shoe 16, is actuated to swing the pins from the reclining positions to upright positions on the alley pin spots after the pads 14 engage the alley bed, as hereinafter more fully described.

Figures 3, 4:
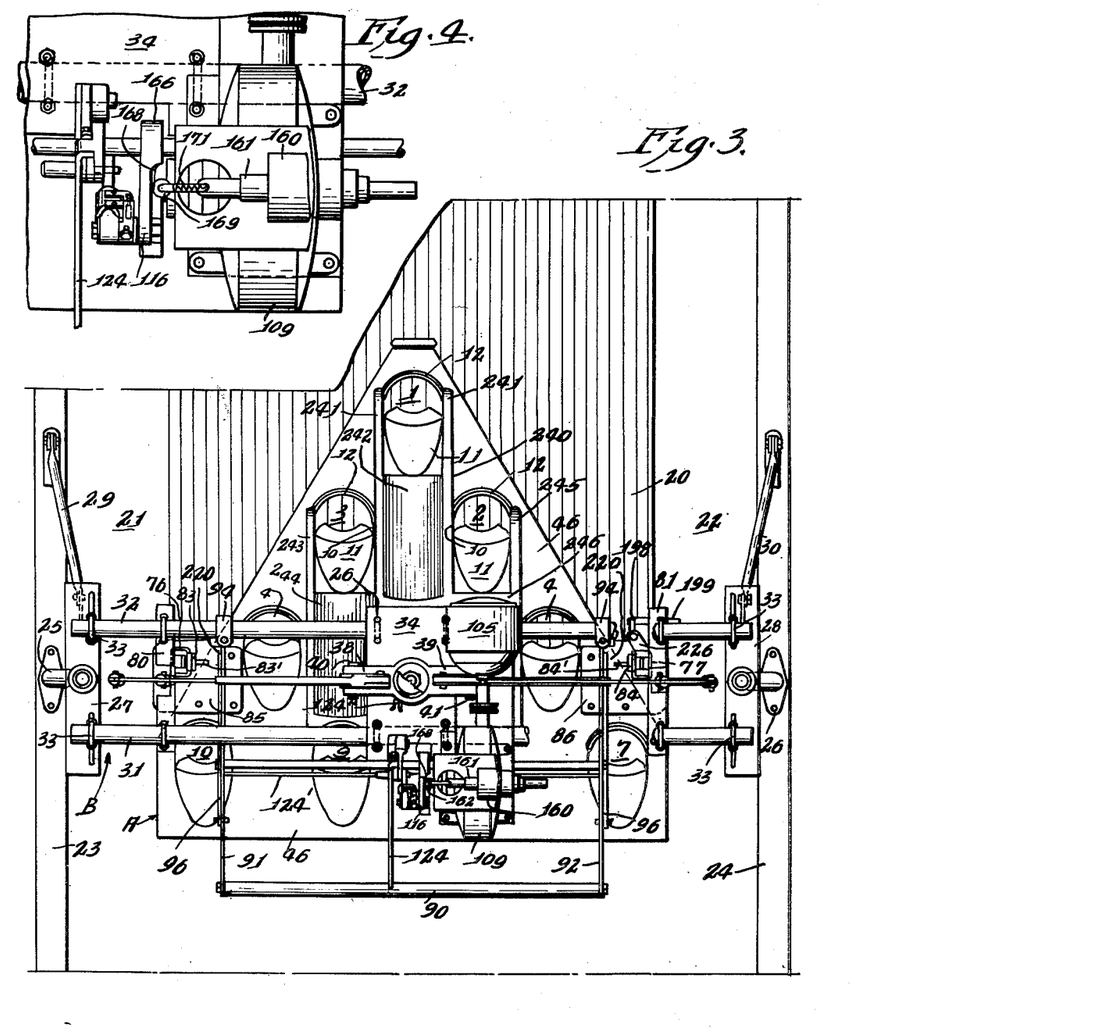
Fig. 3 is a plan view.
Fig. 4 is an enlarged fragmentary plan view.

As shown in Figs. 1 and 3, the bowling alley bed 20 is located between gutters 21 and 22 and kickbacks 23 and 24. Upstanding from the kickbacks is the supporting frame B including vertical tubular member 25 and 26, horizontal top members 27 and 28, and inclined braces 29 and 30. A pair of parallel horizontal tubular members 31 and 32 extend between the top members 27 and 28 and are secured thereto by means of U-clamps 33. Somewhat centrally of the members 31 and 32 is a casting 34 (Figs. 1 and 3–6). This casting has a horizontally extending plate portion 35 overlying the adjacent portions of the members 31 and 32 and secured thereto by a plurality of U-clamps 36. The casting has a vertically extending tubular portion 37 from which bifurcated lugs 38 and 39 extend horizontally to support pivot pins 40 and 41. Bell crank levers 42 and 43 are pivoted respectively on the pins 40 and 41, and have outwardly extending arms 44 and 45 respectively, which are connected to a deck frame 46 of the deck structure A by means of rod devices 47 and 48. These serve to hang the deck structure from the bell crank levers. Normally, the deck structure is counterweighted or biased to its raised position by means of a coiled spring 49 (Figs. 5 and 6) located within the tubular portion 37 of the casting 34 and a tube 50 extending upwardly therefrom. A cap 51 is secured to the upper end of the tube 50 and a rod 52 extends through an aperture in the cap and down within the coiled spring 49 to the lower end of the tubular portion 37. At its lower end the rod 52 has a head 53 which interlocks with the adjacent surface 54 on the member 34 and is prevented from moving upwardly the tubular portion 37 of the casting 34. The coiled spring 49 is located between a collar 55 which is held on the upper portion of the rod 52 by means of a bushing 56 screw-threaded on the rod and a bushing 57 which is slidable on the rod and engages the upper end of a centrally bored member 58 which also slidably surrounds the rod. The member 58 has radial slots 59 and 60 in its opposite sides and carries pins 61 and 62 to which the lower ends of the links 63 and 64 are connected, respectively. The upper ends of the links are pivotally connected to pins 65 and 66 on short arms 67 and 68 of the bell crank levers 42 and 43, respectively.

Figures 5, 6:
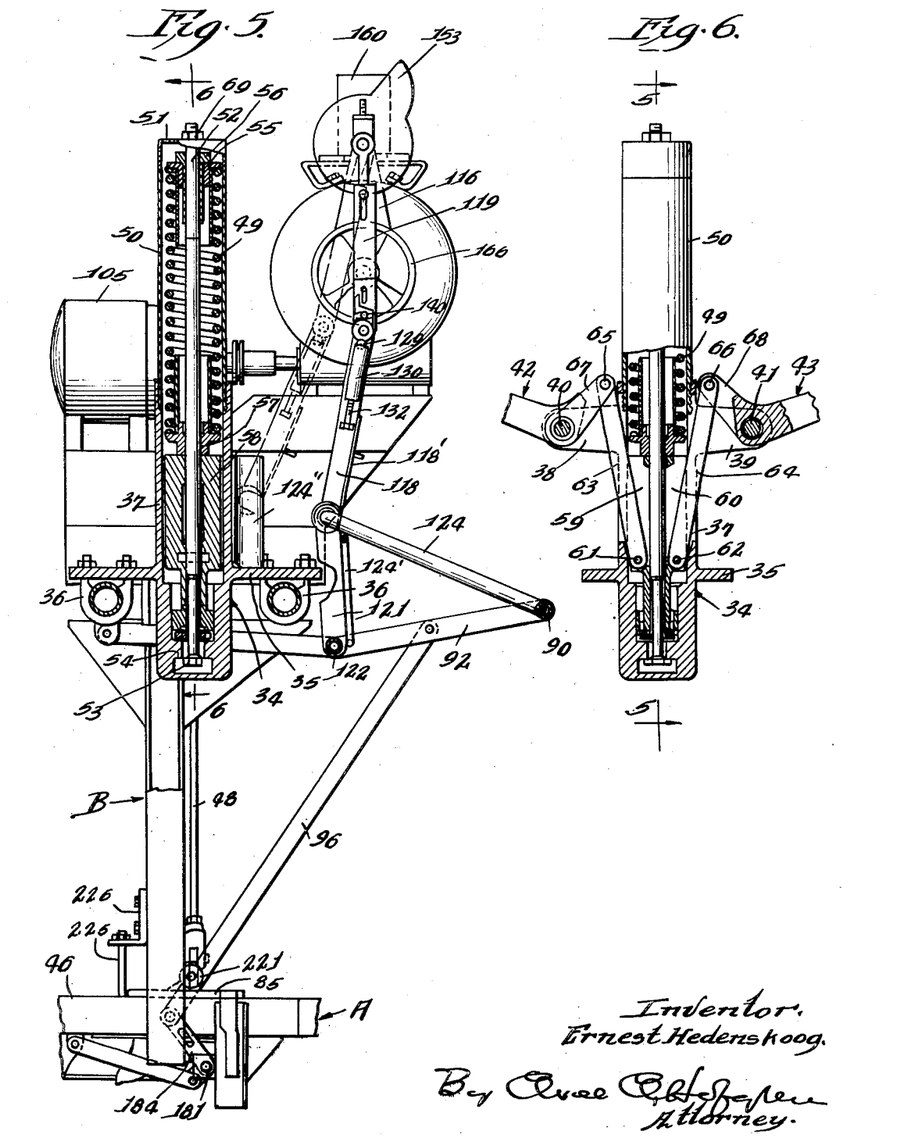
Fig. 5 is an enlarged vertical section along the lines 5—5 of Figs. 1 and 6.
Fig. 6 is an enlarged fragmentary vertical section along the line 6—6 of Fig. 5.

With the deck structure in the raised position shown in Figs. 1, 5 and 6, the coil spring 49 is in a compressed state and pushes downwardly on the member 58, thereby pushing downwardly on the links 63 and 64 and exerting forces on the bell crank levers 42 and 43 to maintain the bell crank levers in the position shown in Fig. 1 and the deck structure in its raised position. As the deck structure is moved downwardly by mechanism hereinafter described, the bell crank levers pull the links 63 and 64 upwardly thereby further compressing the spring 49 to a point where it is effective to raise the deck structure after the deck structure moves down and deposits a set of pins on the alley 20. Preferably, the upper end of the rod 52 is anchored in the cap 51 by means of a nut 69 to maintain the rod 52 centrally of the tube 50. The rods 47 and 48 are pivotally connected at their upper ends to the bell crank levers by pins 70 and 71 (Fig. 1) and at their lower ends are pivotally connected to lugs 72 and 73 on the deck structure by means of pins 74 and 75.

During its vertical movements the deck structure is guided by means of a pair of vertically extending channel members 76 and 77 which are integral with bracket members 78 and 79, respectively, these bracket members having horizontally extending angular portions 80 and 81, respectively, clamped to the tubular member 31 and 32 by means of U-clamps 82. Bars 83 and 84 are secured at their lower ends rigidly to the deck structure by means of horizontal plates 85 and 86 respectively, which are riveted to the frame of the deck structure. These bars are reinforced by webs 83' and 84' respectively and carry vertically spaced rollers 87 and 88 which operate in the tracks formed by the channel members 76 and 77 to form a vertical guide means for the deck structure.

If desired, the deck structure may be actuated manually by means including a horizontally extending handle 90 (Figs. 1 to 3) the opposite ends of which are secured to a pair of levers 91 and 92 having their forward ends supported on pivot pins 93 carried on clamps 94 on the tubular member 32. These levers form part of toggle mechanisms. Intermediate their ends, the levers 91 and 92 carry pivot pins 95 connected to the upper ends of links 96, the lower ends of which are connected by pins 97 to mechanism of the deck structure A as hereinafter described. By pressing downwardly on the handle 90, force is exerted through the links 96 to move the deck structure downwardly from the loading position, during which movement it is guided by the rollers 87 and 88 in the vertical channels 76 and 77, the links 96 moving closer to a vertical position as the deck structure reaches the bottom of its stroke. Release of the handle 90 by the operator permits the spring 49 to reelevate the deck structure.

Figure 2:
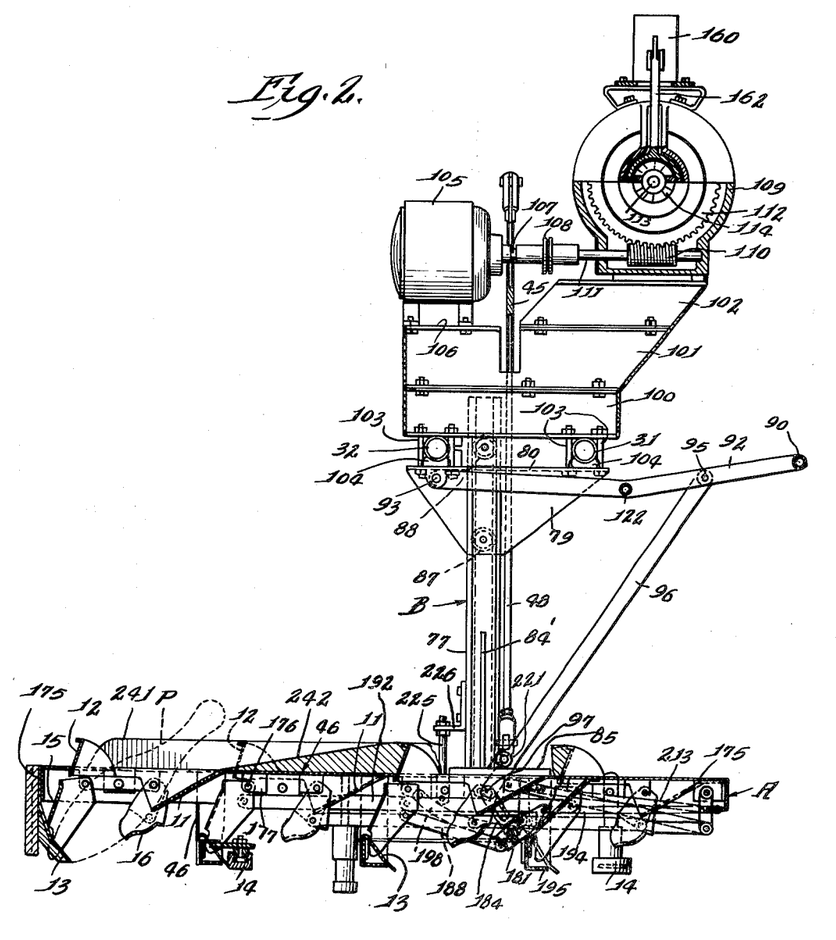
Fig. 2 is a vertical section approximately along the line 2—2 of Fig. 1.
Figures 8, 9:
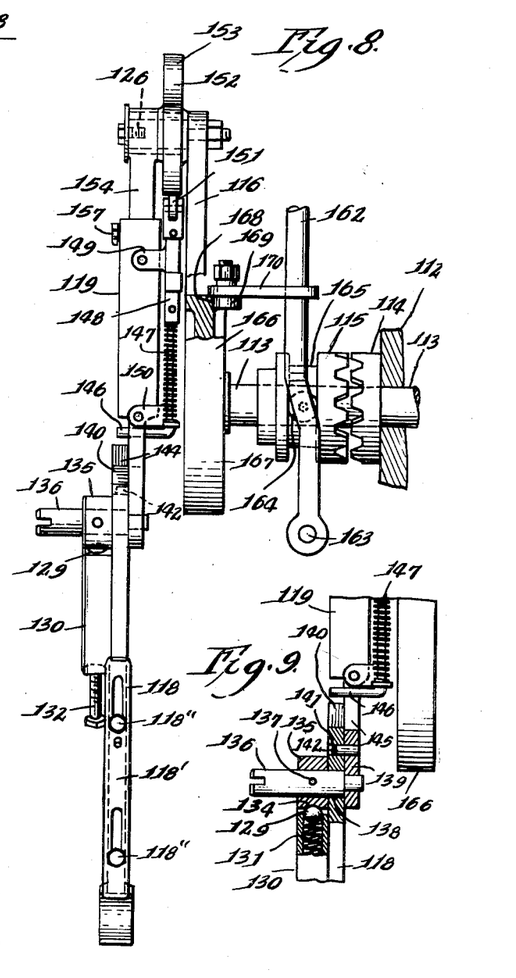
Fig. 8 is a view along line 8—8 of Fig 7.
Fig. 9 is a fragmentary section along the line 9—9 of Fig. 7.

A power drive mechanism for the pinsetter is carried on a framework supported on the parallel tubular members 31 and 32. As shown herein, the framework comprises parts 100, 101, and 102 suitably bolted together and secured to the tubular members 31 and 32 by means of bolts 103 and clamp members 104 (Fig. 2). An electric motor 105 is bolted to the upper portion 106 of the framework and has a shaft 107 connected by means of a flexible coupling 108 to a speed reducer in a casing 109 which consists of a worm 110 on an input shaft 111 and a wormwheel 112 which is rotatably mounted on an output shaft 113. The wormwheel 112 has integrally formed thereon, or otherwise rigidly attached thereto, a clutch member 114 (Fig. 8). An opposing clutch member 115 is slidably splined on the output shaft 113 so that when the clutch members are engaged the output shaft 113 is driven by the motor through the speed reduction gearing 110, 112.

Figure 7:
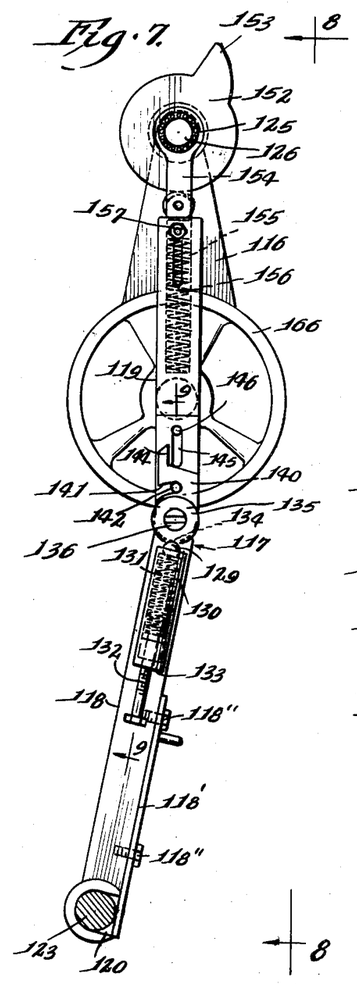
Fig. 7 is an enlarged fragmentary vertical view of the crank drive mechanism with the parts in the positions assumed when the deck structure is in its raised position.

The motor and speed reduction gearing are so selected that the shaft 113 makes a single revolution during the downward and return upward movement of the deck structure A during a pinsetting operation. This permits the use of a crank 116 on the shaft 113, the crank being suitably secured to the shaft so as to be rotated thereby. The crank is arranged on the shaft so as to be in an upwardly extending position as shown in Figs. 7 and 8 when the deck structure is in its upward position, the crank going through its lowermost position during the time the deck structure is adjacent the alley for the purpose of setting pins thereon, thus providing a smooth operation during the pinsetting period and a smooth stop for the deck structure in its raised position. The crank 116 is connected to drive the deck structure by means including a connecting rod 117 formed of two relatively movable parts 118 and 119. The part 118 has its lower end slotted at 120 to facilitate securing said lower end to a link 121 extending upwardly from a tubular cross rod 122 between the levers 91 and 92. A plate member 118' is slidably secured to the part 118 by means of bolts 118'' so that the plate can be moved to the position shown in Fig. 7 when the drive mechanism is engaged and a pin 123 on the upper end of the link 121 is secured in the slot 120. Preferably, the link 121 is braced by means of a rod 124 secured between the pin 123 and the handle 90 as shown in Figs. 3 and 5, and by a bent cross rod 124'. When the pinsetter is to be operated manually the part 118 is disengaged from the pin 123 and swung to the dotted line position of Fig. 5 where it is held by a spring clip 124'' on the casting.

Figure 10:
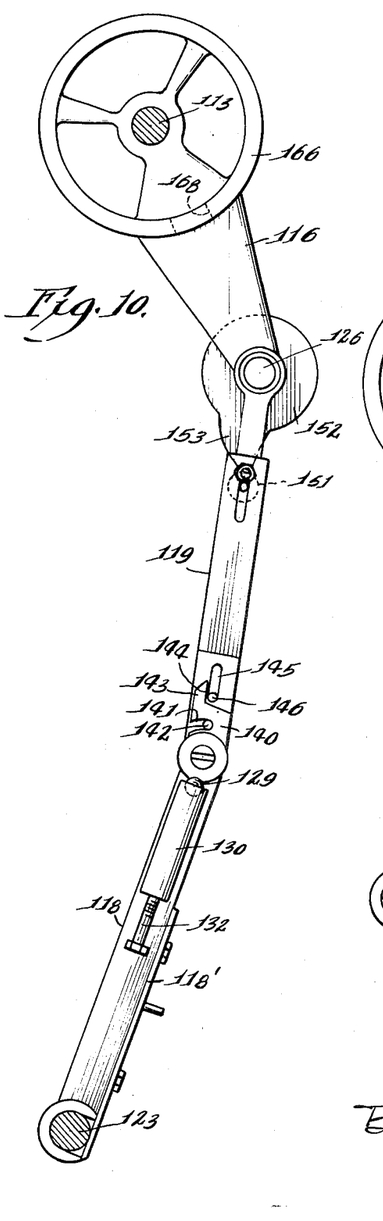
Fig. 10 is a view similar to Fig. 7 but with the parts in the positions assumed when the deck structure is in its lowered position.

The upper end of the connecting rod part 119 carries a needle bearing 125 which engages a pin 126 secured to the end of the crank 116. Normally, the connecting rod parts 118 and 119 are secured yieldably together at a slight angle, shown in Figs. 5, 7 and 10, by means of a detent device comprised of a spring-pressed ball 129 located in a bore in a casing 130 on the part 118 and pushed by a coiled spring 131, the compression of the coil spring being adjustable by means of a screw device 132 screw-threaded into the opposite end wall 133 of said casing. The spring-pressed ball 129 is adapted to engage in a shallow recess 134 in a collar 135 which is secured to a short shaft 136 by means of a pin 137, the short shaft passing through a bore 138 in the part 118 and being welded or otherwise suitably secured to the adjacent end 139 of the connecting rod part 119 as shown most clearly in Fig. 9.

Figure 11:
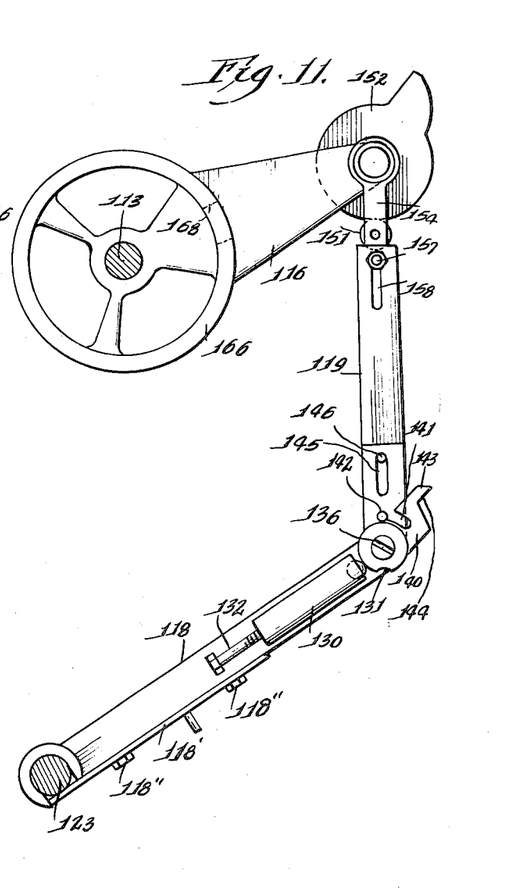
Fig. 11 is another view similar to Fig. 7 but with the parts in the positions assumed when the deck structure meets an obstruction during its downward movement.

The connecting rod is formed in two relatively movable parts so that if, during the descent of the deck structure, the deck structure encounters an obstruction, the power drive will be rendered ineffective and thereby prevent injury to the deck structure and the obstruction. In view of the relatively slight angle between the connecting rod parts as shown in Fig. 7, a detent device such as a spring-pressed ball 129 serves to hold the parts in this position in the absence of an obstruction. If, however, an obstruction is encountered, the spring-pressed ball moves out of the recess 134 and rolls around the collar 135 while the connecting rod parts 118 and 119 swing with respect to each other as shown in Fig. 11.

The peak load encountered by the motor and drive mechanism during a pinsetting operation occurs when the deck structure reaches the alley whereupon the pins carried thereby are simultaneously up-ended from reclining positions to vertical positions and then centered on pin spots on the alley bed. In order to have the release mechanisms in the drive effective to prevent injury to the deck structure or the obstruction it encounters, it is necessary that the release mechanisms operate to disrupt the drive even though the load on the drive mechanism, due to an obstruction, is below peak load. To permit such a setting of the release mechanism and still obtain satisfactory operation of the pin setter at the peak load when the pins are up-ended, a means is provided for rendering the release mechanism ineffective during the pinsetting operation. As disclosed herein this means consists of mechanism for locking the parts 118 and 119 together to prevent relative pivotal movement therebetween.

The upper end 140 of the connecting rod part 118 extends beyond the pin 136, as shown most clearly in Figs. 7 to 11. This end is provided with a transverse slot 141 into which a pin 142 on connecting rod part 119 moves as the parts assume the slight angular positions shown in Figs. 7 to 10. As the pin 142 reaches the bottom of the slot 141 the spring-pressed ball 129 enters the recess 134. Thus the pin 142 and slot 141 facilitate the operation of the spring-pressed ball to secure the parts 118 and 119 releasably in their drive positions as shown in Figs. 7 to 10.

The end 140 of the connecting rod part 118 has a projecting portion 143 which, when the parts are in the positions shown in Figs. 7 to 10, has its side surface 144 lying alongside a slot 145 in the part 119. A pin 146 is slidably mounted in the slot 145 and is movable from the position shown in Fig. 7 (where it is when the crank 116 extends upwardly) to the position shown in Fig. 10 as the crank 116 reaches the position during its clockwise rotation wherein the pins are about to be set. With the pin 146 in the position shown in Fig. 10, the pin locks against the surface 144 of the projection 143 and thereby prevents relative movement between the connecting rod parts 118 and 119.

To move the pin 146 into its locking position, the pin is herein shown formed on one end of a rod 147 extending longitudinally of and carried slidably on the conencting rod part 119. As shown best in Figs. 8 and 9 the rod 147 is slidably supported in a casing 148 which has lugs 149 and 150 by which it is secured to the part 119. At its upper end the rod 147 carries a roller 151 which engages a cam member 152 secured rigidly to the end of the crank 116. The cam 152 has a single lobe 153 which extends upwardly as shown in Fig. 7 when the mechanism is idle but which rotates to the position shown in Fig. 10 and operates to depress the roller 151 and rod 147 and thereby move the lock pin 146 into the position shown in Fig. 10, during a pin setting operation.

As an added protection and to prevent injury to the machine in the event there is an obstruction preventing operation of the pin setting mechanism after the deck structure has reached the alley bed, the part 119 has a portion 154 which is cylindrical in form and slides in a bore 155 in the part. A rather heavy coiled spring 156 is inserted behind the cylindrical portion 154 and serves normally to maintain that portion in the position shown in Figs. 7, 8, 10 and 11. A headed pin 157 carried on portion 154 extends through a slot 158 in the part to limit outward movement of portion 154. The portion 154 can therefore yield, if necessary, against the spring 156, the spring being sufficiently heavy not to yield appreciably during normal operation of the machine.

Preferably, the motor 105 runs continuously while the pinsetter is in use, the drive being interrupted by the clutch 114, 115 which remains disengaged. The clutch is adapted to be engaged by means including an electric solenoid 160 the armature 161 of which is connected to the upper end of a clutch lever 162 (Figs. 1, 3 and 8), the lower end of which is pivoted on a pin 163 mounted in the casing 109. The lower end of the clutch lever is bifurcated so as to straddle the clutch member 115 and carries a pair of rollers 164 operable in an annular groove 165 in the clutch member. Energization of the solenoid causes initial engagement of the clutch whereupon the output shaft 113 is driven to rotate the crank 116. The output shaft 113 has a cam 166 formed integrally with the crank 116 and provided with a cam surface 167, the cam surface having a recessed portion 168 into which a follower 169 moves when the clutch is disengaged. This follower is in the form of a roller carried on a bar 170 secured to the clutch lever 162. Thus, when the clutch has been engaged by energization the solenoid, the cam 166 operates to keep the clutch engaged during a single revolution of the cam 166 or until the recess 168 again reaches a position opposite the roller 169 whereupon the coil spring 171 connected between the upper end of the clutch lever 162 and a stationary post 172 operates to disengage the clutch. A starting switch 173 for controlling the solenoid may be located at a position convenient to the operator when standing in the pit of the alley.

The deck structure A illustrated herein is generally the same as that disclosed and claimed in U. S. Letters Patent No. 2,284,208 to Ernest Hedenskoog dated May 26, 1942. The construction of the shoes 15 and 16, the timing of their movements, and the support of each pin P in a reclining position are so inter-related that just prior to the time of setting of the pins they are supported very closely adjacent the bed and at the time of setting are given a lift so that they are set without scraping the bed and yet without dropping any substantial distance on to the bed. To that end, each front shoe 15, as best seen in Figs. 2, 12, 13, 15 and 16, is curved from side to side and is pivotally supported by pivot pins 176 extending through its upper rear portions and flanges 177 extending downwardly from the top of the deck frame 46. On their bottom edges, the shoes 15 are recessed at 178 to straddle the strap-like pin supporting members 13. Because of the shape of these shoes, they contact pins at their lower edges and then only at laterally spaced points. This gives each front shoe 15 a two point contact only, assuring a more accurate action thereof on a pin to be set.

Figure 13:
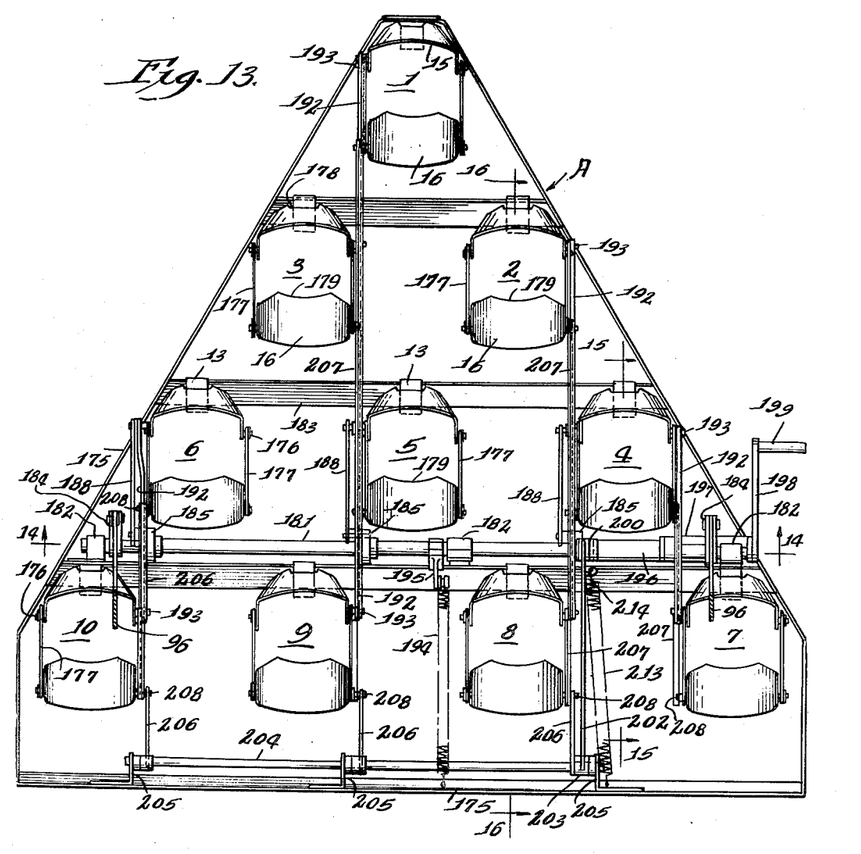
Fig. 13 is a fragmentary plan view of the deck structure with the major portion of the top plate broken away.
Figure 14:
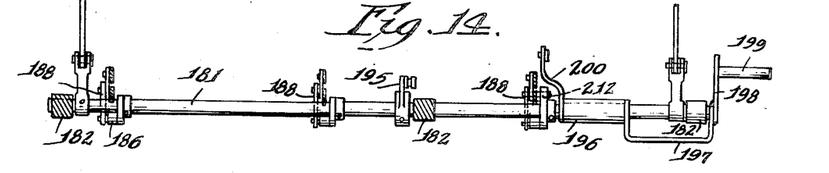
Figs. 14, 15 and 16 are vertical sectional views along the lines 14—14, 15—15 and 16—16, respectively of Fig. 13.

The rear jaws 16 are also curved from side to side. The shape along the lower or contact edge 179 is best seen in Fig. 13, and results in the jaw having a main portion like a blunt ended scoop. They are pivotally supported at their upper ends by pivot pins 180 on the flanges 177 and which pins are spaced rearwardly from the front shoe pivot pins 176. Here again contact of each jaw 16 with a pin is only at spaced points of the edge 179 thereof to provide laterally spaced contact.

Suitable mechanism is provided for appropriately interconnecting the several shoes and for effecting their control from the actuating means.

Such mechanism includes a rockable main shaft 181 (see Figs. 2 and 13 to 16) extending transversely of the frame 46 and journaled in castings 182 secured to a frame cross member 183. At each end, the shaft 181 has pinned thereto an arm 184 which serves as the connecting medium between the shaft and the links 96 of the actuating means, as will later appear. Also pinned to the shaft 181 for rotation therewith are a plurality of cranks 185, each having an arm 186 and one having an arm 187 almost diametrically opposed to the arm 186. These cranks all have the same angular position relative to the shaft 181 but are spaced longitudinally thereof as shown in Fig. 13. Pivotally connected to the arm 186 of each crank is one end of an actuating link 188 the other end of which is pivotally connected as by a pin 191 to a link 192 which is connected pivotally by a pin 193 to the front shoe of the first pocket forward of the crank. This shoe is in turn connected to the front shoe of pockets in other rows by the link 192 and pins 193. In this manner all of the front shoes 15 are interconnected for simultaneous action. The front shoes are yieldably urged to an open or normal position by a large tension spring 194 (Figs. 2, 12 and 13) which is anchored at one end to the frame 46 and at the other end to an arm 195 pinned on the shaft 181.

Loose on the shaft 181 near one end thereof is a sleeve 196 (Figs. 12, 13 and 14) having at its outer end an offset U-shaped connection 197 with a crank arm 198. At the free end of the arm and projecting laterally therefrom is a pin 199. On the inner end of the sleeve 196 is a second arm 200 which projects vertically. This arm has at its free end (see Figs. 12 and 16) a pin 201 connected to the forward end of a driving link 202. The rear end of the link 202 is pivotally connected to an arm 203 secured to a rear shaft 204 rotatably supported in brackets 205 on the frame 175. This and other arms 203 are connected to actuate the rear shoes 16 by links 206 and 207 and pins 208. The rear shoes 16 are also adapted to be actuated by the main shaft 181 by the upwardly extending arm 187 of one of the cranks 185 (Figs. 12, 13, 14 and 16) which is connected to the link 207 by the hereafter described linkage. A short link 209 is pivoted at one end by a pin 210 to the link 207 and at its other end is formed with an elongated longitudinal slot 211 which receives a pin 212 carried on the end of arm 187 of a crank 185. This provides a lost motion connection with the main shaft 181 and provides for movement of the rear shoes independently of the front shoes. A tension spring 213 (Figs. 2 and 13) is anchored at one end to the frame 46 and at the other end to a lug 214 on the link 202, thus tending to rotate the arm 200 and sleeve 196 in a clockwise direction, as viewed in Figs. 2, 15 and 16, and tending to move the rear shoes 16 to fully open position. The proportioning of the parts is such that when the rear shoes are in pin locating position the pin 212 on arm 187 is just short of the righthand end of the slot 211, as viewed in Fig. 16.

Figure 15:
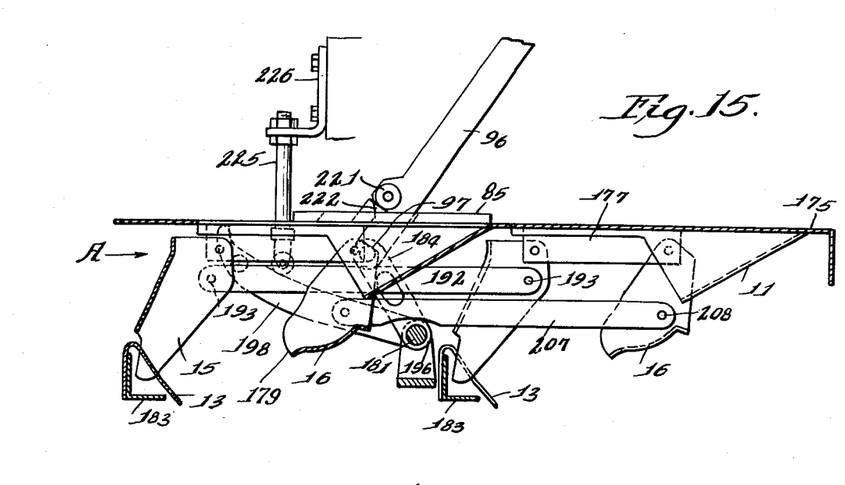
Figure 15A:
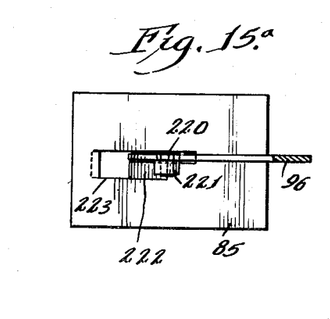
Figure 16:
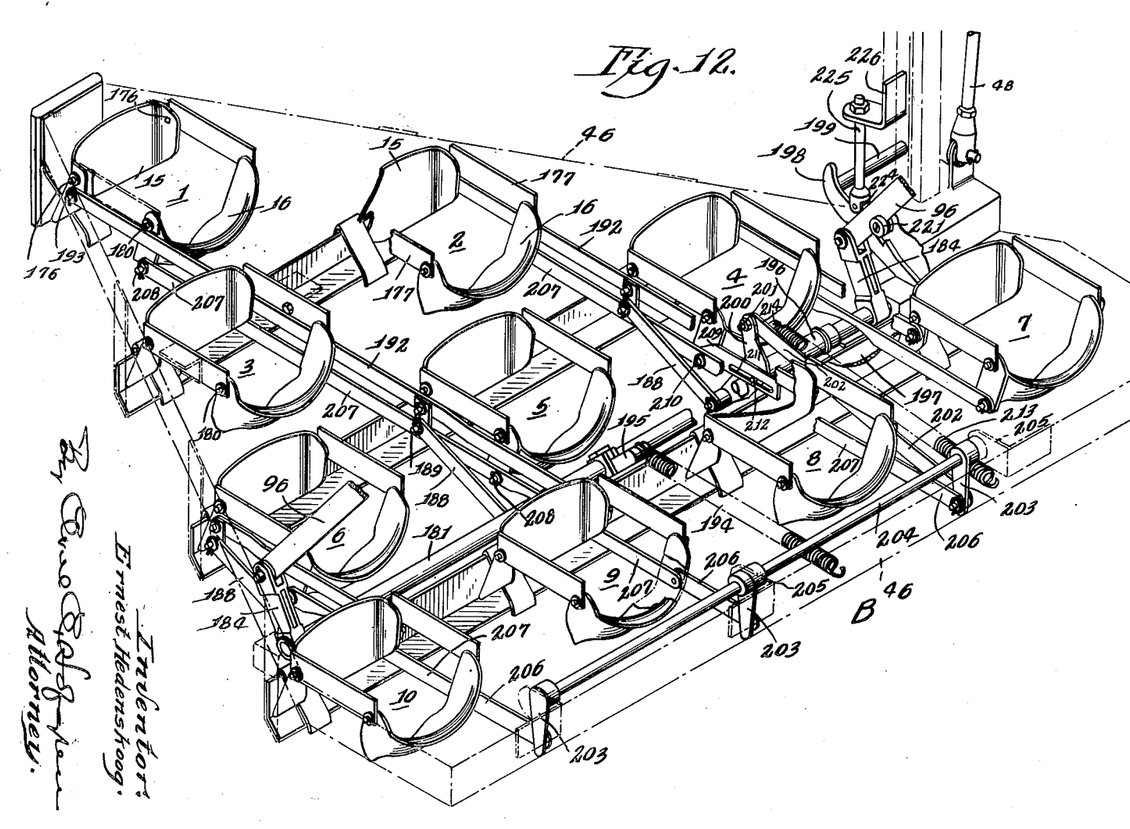

It is a feature of this machine that both the vertical movement of the deck structure A, as well as the actual pin setting, are effected through power actuating means. The main actuating links 96 pass through slots 220 (Fig. 3) in the top of the deck frame 46 and are pivotally connected to the ends of arms 184 by the pins 97. The links 96 carry rollers 221 thereon which, when the deck structure is in its raised position as shown in Figs. 2, 15 and 16, are positioned immediately above and in contact with cam surfaces 222 on the plates 85 and 86. These cam surfaces are located alongside the slots 220 as shown best in Fig. 15a, so that during the lowering movement of the deck structure the rollers 221 ride over the cam surfaces as the links 96 swing counterclockwise about the pins 97 (Figs. 2 and 15) to a more vertical position. As the deck structure A reaches its lowest position the rollers 221 are to the left of the cams 222 and during the following movement of the links 96 the rollers pass downwardly through the wide portions 223 of the slots 220 in the deck frame. Said following movement of the links 96 causes counterclockwise movement of the arms 184 and shaft 181 to swing the shoes 15 and 16 towards each other to set pins. After pins are set the links 96 move upwardly first to rotate the shaft 181 clockwise to separate the front and rear shoes so they may pass over standing pins, and then to return the deck structure to its upper or loading position.

During the final portion of the upward return movement of the deck structure the rear shoes 16 are swung to the position shown in Figs. 2, 15 and 16 by engagement of crank arm 198 with a roller 224 which is rotatably mounted on the stationary frame of the machine by a vertical rod 225 and a bracket 226 on the channel member 77 (Figs. 2 and 3). In this position the shoes 16 prevent pins from dropping through the pockets during the loading operation. Conversely, during the initial portion of the downward movement of the deck structure, and useful when some of the pins are standing on the alley bed, the crank arm 198 recedes from the roller 224 to permit spring 213 to swing jaws 16 to full open position conditioning the pockets for the reception of standing pins.

When it is desired to pick up pins which are already standing on the alley bed, the rear shoes 16 may be swung from their full open positions to positions corresponding with those shown in Figs. 2, 15 and 16, thereby swinging the pins back onto the ledges 13. This operation of the rear shoes may be accomplished by the attendant when the deck structure is in its lowermost position by actuating the crank arm 198 in a counterclockwise direction (Figs. 2 and 15) by pressing downwardly on the pin 199 on the crank arm, as by stepping on it. Once the pins are swung back onto the ledges 13, the crank arm may be released before the deck structure rises, the pins then reclining in the chutes 11 during the upward movement of the deck structure.

To operate the machine the attendant first inserts pins into the ten pin pockets of the deck structure and then presses the button 173. Thereupon the solenoid 160 actuates the clutch 114, 115 through the intervening connections and at the same time pulls the roller 169 out of the cam recess 168. The crank 116 thereupon turns with the shaft 113. During the first half of the crank's revolution the deck structure moves downwardly until the members 14 engage the alley bed, after which the links 96, having reached more vertical positions than those shown in Figs. 2 and 5, press down on the arms 184 and actuate the shoes to up-end and set the pins upon the alley bed. As the crank 116 goes through its lowermost position at which time the pins are being set, the parts 118, 119 of the connecting rod are locked together by the pin 146, which has then moved to the position shown in Fig. 10. The crank continues to rotate, during its upward movement elevating the deck structure, until the time when the roller 169 re-enters the cam recess 168 and the clutch 114, 115 is disengaged by the spring 171.

If the attendant wishes to pick up pins standing upon the alley bed, he also presses the start button 173 and as the deck structure rests upon the alley bed he presses on the pin 199 of the crank arm 198 in Figs. 3, 12 and 13, and moves the rear shoes to swing the pins back on to the ledges 13, the deck structure then moving upwardly and elevating the pins with it.

I claim:

1. In combination with a bowling pinsetter having a deck structure adapted to receive bowling pins when in a raised position and to set them when in a lowered position, a supporting structure having means for guiding the deck structure vertically from its raised to its lowered position and return during a setting operation, means for counterbalancing the weight of the deck structure, and manually operable means for lowering said deck structure, said supporting structure including a pair of parallel horizontally extending tubular members, a power drive unit comprising a frame adapted to be clamped to said parallel tubular members and extending upwardly therefrom, a gear box supported on said frame and having input and output shafts, a motor supported on said frame and connected to drive said input shaft, a crank on said output shaft, said gear box including a clutch device operable when engaged to rotate said crank, means operable upon completion of a single rotation of the crank to disengage the clutch device, and means for connecting said crank to actuate said deck structure to lower and raise the deck structure during a single revolution of the crank, said connecting means being readily disconnectable to permit manual operation of the pin setter, said connecting means including a pair of pivotally connected parts, a detent device normally connecting said parts together at a small angle to maintain a driving connection to the deck structure and yieldable to permit the parts to pivot to a greater angle to interrupt the driving connection in the event the pin setter deck meets an obstruction, said detent device automatically re-engaging during the remainder of the revolution of the crank.

2. In a bowling pinsetter having a deck structure provided with pin receiving and setting means thereon, a supporting structure therefor including means for guiding the deck structure for vertical lowering and return movements, and a pair of pivotally supported arms having their free ends connected to said deck structure by links, in combination, a rotatably mounted crank, means for driving said crank including a motor and a clutch, means for connecting said crank to actuate said deck structure comprising a connecting rod pivotally connected at one end to a pin on said crank, a pair of links connecting the other end of said rod to said arms, said connecting rod comprising a pair of pivotally connected parts, a detent device normally connecting said parts together at a small angle to maintain a driving connection to the deck structure and yieldable to permit the parts to pivot to a greater angle to interrupt the driving connection in the event the pinsetter deck meets an obstruction, said detent device automatically re-engaging during the remainder of the revolution of the crank.

3. In a bowling pinsetter having a deck structure provided with pin receiving and setting means thereon, a frame having means for guiding the deck structure for vertical up and down movements, and means for movably supporting said deck structure on said frame, in combination, a rotatably mounted crank, a crank pin thereon, means for driving said crank through a single revolution during a pin setting operation, means for connecting said crank to said deck structure, said connecting means comprising a pair of relatively pivoted parts, a yieldable device normally connecting said parts together at a small angle from a straight line and automatically yieldable to permit the parts to pivot to a greater angle and interrupt the driving connection in the event the pin setter deck structure meets an obstruction, and a lockup device operable to prevent relative movement of said parts as the deck structure moves through its setting position.

4. In a bowling pinsetter having a deck structure provided with pin receiving and setting means thereon and mounted for vertical lowering and return movements, and a pair of pivotally supported interconnected arms having their free ends operatively connected to said deck structure, in combination, a rotatably mounted crank, means for driving said crank including a motor, means for connecting said crank to actuate said deck structure comprising a connecting rod pivotally connected at one end to a pin on said crank, means including at least one link connecting the other end of said rod to said arms, said connecting rod comprising a pair of pivotally connected parts, a detent device normally connecting said parts together at a small angle to maintain a driving connection to the deck structure and yieldable to permit the parts to pivot to a greater angle to interrupt the driving connection in the event the pinsetter deck meets an obstruction, said detent device automatically reengaging during the continued movement of the crank.

5. In a bowling pinsetter having a deck structure provided with pin receiving and setting means thereon and mounted for vertical lowering and return movements, and a pair of pivotally supported interconnected arms having their free ends operatively connected to said deck structure, in combination, a rotatably mounted crank, means for driving said crank including a motor, means for connecting said crank to actuate said deck structure comprising a connecting rod pivotally connected at one end to a pin on said crank, means including at least one link connecting the other end of said rod to said arms, said connecting rod comprising a pair of pivotally connected parts, a detent device normally connecting said parts together at a small angle to maintain a driving connection to the deck structure and yieldable to permit the parts to pivot to a greater angle to interrupt the driving connection in the event the pinsetter deck meets an obstruction, said detent device automatically re-engaging during the continued movement of the crank, and means operable as the deck structure moves through its setting position to prevent movement between the parts of the connecting rod.

6. In a bowling pinsetter having a deck structure provided with pin receiving and setting means thereon, a supporting structure therefor including means for guiding the deck structure for vertical lowering and return movements, and a pair of pivotally supported arms having their free ends connected to said deck structure by links, in combination, a rotatably mounted crank, means for driving said crank including a motor and a clutch, means for connecting said crank to actuate said deck structure comprising a connecting rod pivotally connected at one end to a pin on said crank, a pair of links connecting the other end of said rod to said arms, said connecting rod comprising a pair of pivotally connected parts, a spring-pressed detent device mounted in one of said parts normally connecting said parts together at a small angle to maintain a driving connection to the deck structure and yieldable to permit the parts to pivot to a greater angle to interrupt the driving connection in the event the pinsetter deck meets an obstruction, said detent device automatically re-engaging during the remainder of the revolution of the crank, and means including a movable pin mounted on one of said parts and engageable with said other part to prevent movement between the parts of the connecting rod as the deck structure moves through its setting position.

7. A bowling pin setter having, in combination, a supporting frame, a deck structure guided on said supporting frame for vertical movement toward and from an alley bed, means biasing said deck structure toward raised position, said deck structure comprising a deck frame having a plurality of pin receiving pockets therein, pin receiving and setting mechanism carried by said deck frame including a front and rear shoe for each pocket, actuating mechanism therefor carried on the deck structure, said rear shoes being mounted for movement jointly with or independently of said front shoes, independent means biasing each of said front and rear shoes to separated positions, and means for lowering said deck frame on to the alley bed and thereafter operating the actuating mechanism for said shoes to move the front and rear shoes towards each other to pin setting positions comprising a lever pivotally connected to said supporting frame, a link pivotally connected to said lever and to the actuating mechanism for the shoes, said biasing means causing return of the shoes to their normal separated positions in response to upward movement of the deck structure, means operable when the deck frame approaches raised position to swing the rear shoes toward the front shoes to prevent pins from dropping through the deck frame, said biasing means causing return of the rear shoes to their normal separated position in response to the initial downward movement of the deck structure, and means selectively operable alternatively when the deck frame is in its lower pin setting position to swing said rear shoes toward the front shoes independently thereof and transfer pins from the alley bed to the pin receiving mechanism.

8. A bowling pin setter having, in combination, a supporting frame, a deck structure guided on said supporting frame for vertical movement toward and from an alley bed, means biasing said deck structure toward raised position, said deck structure comprising a deck frame having a plurality of pin receiving pockets therein, pin receiving and setting mechanism carried by said deck frame including a front and rear shoe for each pocket, actuating mechanism therefor carried on the deck structure including a rotatable actuating shaft, said rear shoes being mounted for movement jointly with or independently of said front shoes, independent means biasing each of said front and rear shoes to separated positions, and means for lowering said deck frame on to the alley bed and thereafter operating said actuating mechanism to move the front and rear shoes towards each other to pin setting positions comprising a lever pivotally connected to said supporting frame, a link pivotally connected to said lever and to said rotatable actuating shaft, said biasing means causing return of the shoes to their normal separated positions in response to upward movement of the deck structure, means operable when the deck frame approaches raised position to swing the rear shoes toward the front shoes to prevent pins from dropping through the deck frame, said biasing means causing return of the rear shoes to their normal separated position in response to the initial downward movement of the deck structure, and means including a collar surrounding a portion of said actuating shaft and operatively connected to said rear shoes selectively operable alternatively when the deck frame is in its lower pin setting position to swing said rear shoes toward the front shoes, independently thereof, and transfer pins from the alley bed to the pin receiving mechanism.

References Cited in the file of this patent

UNITED STATES PATENTS

| Number | Name | Date |
|---|---|---|
| 996,250 | Hughes | June 27, 1911 |
| 1,153,689 | Hobbs | Sept. 14, 1915 |
| 1,294,959 | Seymour | Feb. 18, 1919 |
| 1,612,867 | Hedenskoog | Jan. 4, 1927 |
| 1,615,064 | Bishop | Jan. 18, 1927 |
| 2,015,428 | Hedenskoog | Sept. 24, 1935 |
| 2,229,852 | Kaufman | Jan. 28, 1941 |
| 2,284,208 | Hedenskoog | May 26, 1942 |
| 2,300,802 | Parra et al. | Nov. 3, 1942 |
| 2,445,688 | Parra et al. | July 20, 1948 |
| 2,450,249 | Murphy | Sept. 28, 1948 |
| 2,530,385 | Frye | Nov. 21, 1950 |
| 2,591,265 | Johns et al. | Apr. 1, 1952 |